Jan. 3, 1967 N. O. ROSAEN 3,295,679
BAYONET FLUID FILTERING ASSEMBLY
Filed April 14, 1964 2 Sheets-Sheet 2

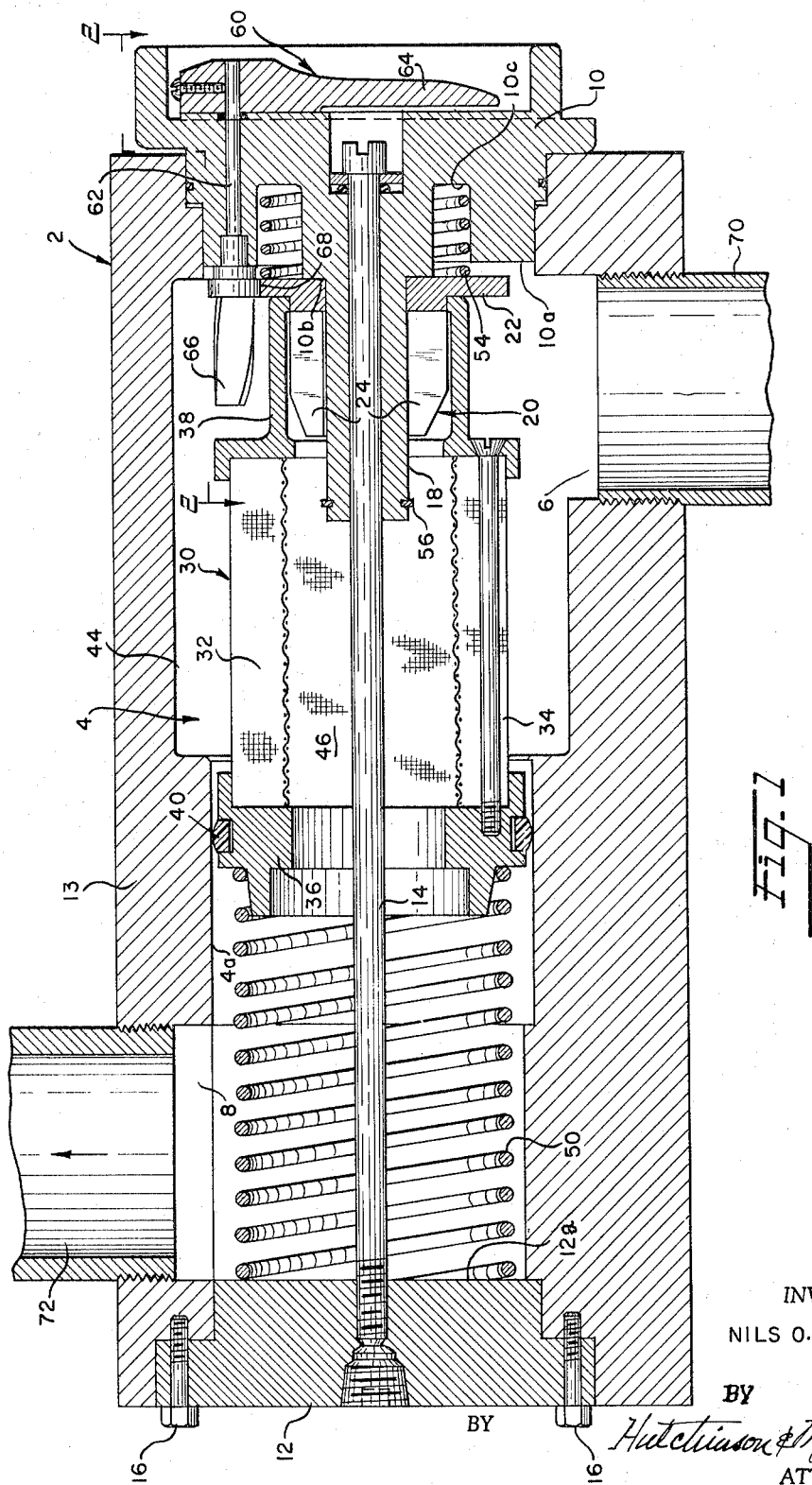

INVENTOR
NILS O. ROSAEN

BY Hutchinson & Milans
ATTORNEYS

United States Patent Office 3,295,679
Patented Jan. 3, 1967

3,295,679
BAYONET FLUID FILTERING ASSEMBLY
Nils O. Rosaen, Bloomfield Hills, Mich., assignor to The Rosaen Filter Company, Hazel Park, Mich., a corporation of Michigan
Filed Apr. 14, 1964, Ser. No. 359,749
7 Claims. (Cl. 210—90)

This invention relates generally to a fluid filtering apparatus, and more particularly to improved filtering apparatus of the type including a filter cartridge that is automatically shiftable, when clogged by contaminates during prolonged use, in its housing to a by-pass position which permits flow of unfiltered fluid through the filter housing.

In many hydraulic applications, for example, in heavy earth moving apparatus, in large power tools, presses and the like, filter means are normally provided for filtering foreign particles and impurities from the pressure fluid, which fluid is generally oil. Since clogging of the filter element produces an interruption or reduction of fluid flow through the system that might cause irreparable damage to such devices as suction pumps, hydraulic motors and the like, it has been proposed in the past to provide by-pass means that are automatically operable upon clogging of a filter element to by-pass the supply fluid around the filter element directly to the outlet of the filter housing. In one type of system, use is made of a bayonet-type filter cartridge assembly that, when clogged, is automatically shifted in the filter housing from a normal filtering to a fluid by-passing position. In this type of system it is desirable to provide an indication externally of the filter housing of the state of cleanliness of the filter element so that the operator will be continuously advised as to whether or not the element needs cleaning.

A primary object of the present invention is to provide an improved fluid filtering apparatus including a tubular filter cartridge assembly that is automatically shifted in a housing by fluid pressure means in accordance with the state of cleanliness of the filter, and by-passing and indicating means for indicating the position of the cartridge assembly in the housing during initial partial clogging of the filter element and for opening filter by-pass passages upon substantial clogging of the filter. According to the invention, the by-passing and indicating means comprise a sleeve concentrically arranged for sliding movement relative to one end of said tubular filter cartridge, and spring means biasing the sleeve toward said filter cartridge to effect closing of by-pass passages contained in the sleeve. The sleeve normally travels in unison with the filter cartridge and operates indicator means external of the housing in accordance with the position of the sleeve and cartridge in the housing. Stationary stop means are provided for limiting the extent of travel of the sleeve, whereby when the filter becomes clogged to an appreciable extent, the sleeve engages the stop and the filter is displaced relative to the sleeve by the fluid pressure means to effect opening of the aforementionad by-pass passages.

Other objects and advantages of the invention will become apparent from a study of the following specification when considered in conjunction with the accompanying drawing, in which:

FIGURE 1 is an axial sectional view of the fluid filtering apparatus;

Figure 4:
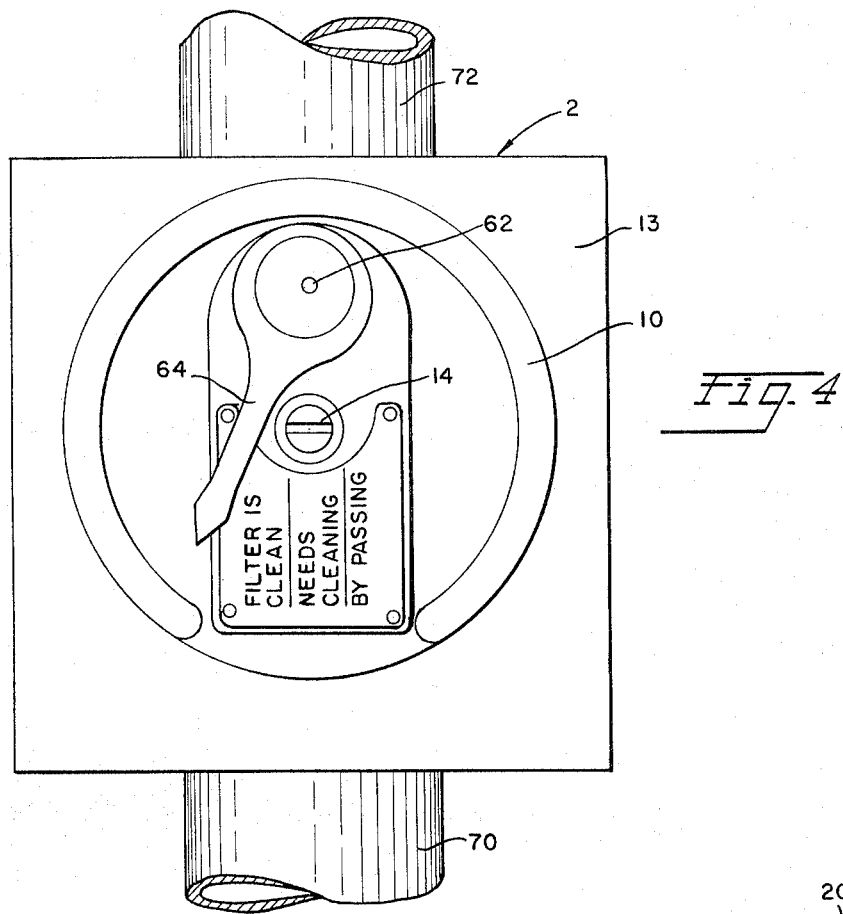
FIGURE 4 is a right-hand end elevational view of the apparatus of FIGURE 1.
Figure 2:
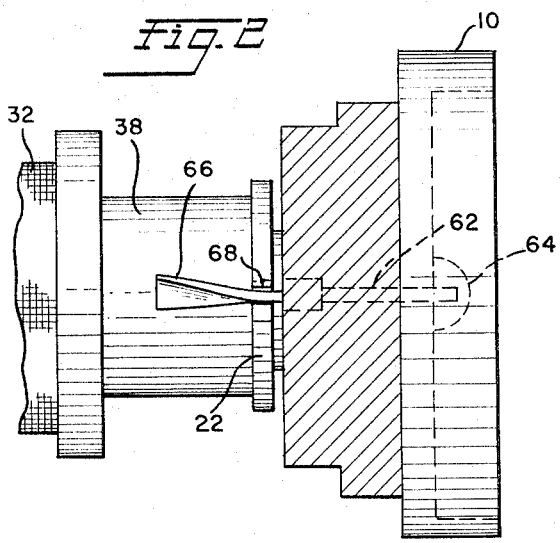
FIGURE 2 is a sectional view taken along line 2—2 of FIGURE 1.
Figure 3:
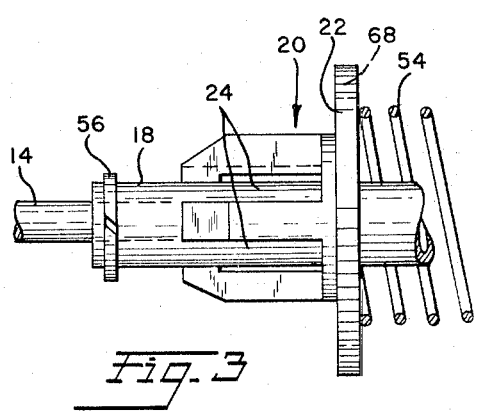
FIGURE 3 is a detailed elevational view illustrating the mounting on the housing projection of the by-pass and indicating sleeve.

Referring first more particularly to FIGURE 1, the filtering apparatus includes a housing 2 containing a generally cylindrical cavity 4 and longitudinally spaced inlet and outlet openings 6 and 8. At each end the housing contains removable sections 10 and 12 that are rigidly connected with housing body 13 by a bolt 14 that extends axially through a bore in section 10 and is threaded at its free end in a bore in section 12. Section 12 is further secured to body 13 by bolts 16. The adjacent surfaces 10a and 12a of the removable housing portions 10 and 12 define the end walls of the cavity adjacent the inlet and outlet openings 6 and 8, respectively.

Extending axially into the housing cavity 4 from the housing section 10 is a cylindrical projection 18 upon which is slidably mounted an annular by-pass sleeve or follower 20. At its right-hand end adjacent the cavity end wall 10a the sleeve is provided with a peripheral flange or abutment 22. Extending axially from the left-hand end of sleeve 20 are a plurality of by-pass slots or passages 24 the purpose of which will be described below.

Slidably mounted in the housing cavity 4 is a rigid tubular filter cartridge assembly 30 consisting of a tubular filter element 32 to the ends of which are rigidly connected by means of a plurality of screws or bolts 34 a pair of annular inperforate end members 36 and 38. End member 38 is slidably mounted on sleeve 20, and end member 36, which is provided on its outer periphery with an annular seal 40, is slidably mounted relative to a cylindrical intermediate wall portion 4a of housing cavity 4. The filter assembly 30 defines in the housing cavity 4 an annular outer chamber 44 and an inner chamber 46 outside and inside the tubular filter element 32, respectively. Inlet and outlet openings 6 and 8 are in direct communication with outer and inner chambers 44 and 46, respectively. When the filter assembly is in the FIGURE 1 position, by-pass passages 24 are closed by imperforate sleeve 38, and owing to the sealing cooperation between end member 36 and seal 40 with the cylindrical cavity wall portion 4a, communication between outer chamber 44 and inner chamber 46 is afforded only through the tubular filter element 32.

Axially mounted in the cavity 4 intermediate annular member 36 and cavity end wall 12a is a helical spring 50 which continuously biases the filter cartridge 30 to the right to the FIGURE 1 position. Owing to the biasing force of spring 50 and the abutting engagement of member 38 with flange 22, sleeve 20 is also biased to the right against housing end wall surface 10b as shown in FIGURE 1.

Axially mounted in an annular groove 10c in the cavity end wall 10a of housing portion 10 is a second helical spring 54 which biases sleeve 20 to the left to normally maintain flange 22 in abutting engagement with end member 38. Split washer 56, mounted in an annular groove adjacent the free extremity of projection 18, serves as a stop for limiting the extent of left hand travel of sleeve 20 on the housing projection 18.

In order to provide an indication external of the housing of the position of sleeve 20 (and consequently, of cartridge 30) in cavity 4, indicating means 60 are provided including a rod 62 rotatably mounted in an axial opening in housing section 10. Secured to one end of the rod externally of the housing is a pointer 64. The other end of the rod carries a twisted vane 66 that extends through a radial slot 68 in flange 22 of sleeve 20. Owing to the configuration of the twisted vane, axial movement of sleeve 20 is transformed into rotary movement of rod 62 and pointer 64.

As shown in FIGURE 4, the pointer 64 is pivoted between "FILTER IS CLEAN," "NEEDS CLEANING," and "BY-PASSING" positions.

The inlet and outlet openings 6 and 8 are adapted for connection with pressure fluid supply and return conduits 70 and 72, respectively. In a typical installation, conduit 72 is connected with a suction pump and conduit 70 is connected with sump.

Operation

Assuming that the elements are initially positioned as shown in FIGURE 1, fluid supplied via conduit 70 flows to outlet conduit 72 via inlet opening 6, outer chamber 44, filter element 32, inner chamber 46 and outlet opening 8. By-pass passages 24 are closed by the imperforate end member 38 of the tubular filter assembly during initial flow of fluid through the clean filter element. As shown in FIGURE 4, pointer 64 is initially in the "FILTER IS CLEAN" position.

Assume now that as a result of prolonged use, the filter element 32 becomes partially clogged by sludge, contaminates or foreign particles in the fluid. Because of the impedance to fluid flow through the filter element, the fluid pressure in chamber 44 increases relative to that in chamber 46, whereby the pressure forces acting on the right hand surfaces of the filter cartridge 30 exceed the sum of the biasing force of spring 50 and the pressure forces acting on the left hand surfaces. Consequently, the filter cartridge is gradually shifted to the left as the filter element becomes partially clogged. During this initial left-hand movement of the filter cartridge, sleeve 20 is also shifted to the left by spring 54 (and by the pressure forces acting on the right-hand surfaces of the sleeve) to maintain flange 22 in engagement with the free extremity of end member 38. Owing to the cooperation between flange slot 68 and vane 66, this axial movement of sleeve 20 causes rotation of rod 62 to pivot pointer 64 to the "NEEDS CLEANING" position.

Assuming that the filter element becomes further clogged, the pressure differential between chambers 44 and 46 further increases, whereby filter cartridge 30 and sleeve 20 are further displaced to the left to the position in which sleeve 20 engages fixed stop 56 on housing projection 18. Movement of sleeve 20 into abutting engagement with stop 56 causes pointer 64 to be pivoted to the "BY-PASSING" position. Should the pressure differential between the outer and inner chambers now produce further left-hand travel of the filter cartridge, since sleeve 20 is prevented from further left hand travel by stop 56, end member 38 is shifted to the left relative to sleeve 20, whereupon by-pass passages 24 are opened to permit unfiltered by-pass fluid to flow directly from chamber 44 to chamber 46. The supply fluid continues to by-pass the filter assembly until filter element 32 is cleaned.

To clean or replace the filter unit, the pressure producing means (i.e., the pump, not shown) is deactivated and bolts 14 and 16 are loosened to permit removal of housing end section 12 from the housing body 13. Spring 50 and the filter cartridge assembly are now removed, sleeve 20 being retained in the cavity by stop 56. The filter element 32 is either cleaned or replaced, whereupon the cartridge assembly 30 and spring 50 are reinserted in the cavity, and end section 12 is again secured in place by bolts 14 and 16. During the reassembly of the elements, sleeve 20 is shifted to the right to the FIGURE 1 position against the force of spring 54 by cartridge assembly 30 and spring 50.

It is apparent that, if desired, the by-pass passages may be provided on the end member 38 rather than on the sleeve 20. Furthermore, with appropriate modification the apparatus may be designed to permit reversal of the housing sections 10 and 12 to afford removal of the cartridge from the right hand end of the housing.

While in accordance with the provisions of the Patent Statutes the preferred embodiment of the invention has been illustrated and described, it will be apparent to those skilled in the art that certain changes and modifications may be made without deviating from the invention set forth in the following claims.

What is claimed is:

1. Fluid filtering apparatus, comprising
   a housing containing a cavity and inlet and outlet openings communicating with said cavity;
   filter means mounted for reciprocatory movement in said cavity and defining therein inlet and outlet chambers in direct communication with said inlet and outlet openings, respectively;
   spring means biasing said filter means axially in one direction toward a first position in said cavity in which said chambers are in communication solely via said filter means;
   means responsive to the pressure differential between said inlet and outlet chambers for displacing said filter means in the opposite direction from said first position toward a second position in said cavity; and
   follower means movable in said housing cavity simultaneously with said filter means solely during movement of said filter means between said first position and a third position intermediate said first and second positions, one of said filter and said follower means including a by-pass passage for affording direct communication between said chambers, the other of said filter and said follower means being operable to close said by-pass passage when said filter means is displaced between said first and third positions and to open said by-pass passage when said filter means is displaced between said third and second positions.

2. Apparatus as defined in claim 1 and further including means operable by said follower means for indicating externally of the housing the position of said filter means in said cavity when said filter means is between said first and third positions.

3. Fluid filtering apparatus, comprising
   a housing containing a generally cylindrical cavity, and inlet and outlet openings communicating with and longitudinally spaced relative to said cavity, said housing including a fixed projection extending axially in said cavity from the end wall thereof adjacent said inlet opening;
   a sleeve mounted for sliding movement on said housing projection, said sleeve including on its outer periphery an abutment adjacent said cavity end wall, said sleeve containing adjacent its other end at least one by-pass passage;
   tubular filter means mounted for axial sliding movement in said housing cavity and defining therein an annular outer chamber and an inner chamber outside and within said filter means, respectively, said inlet and outlet openings being in communication solely with said outer and inner chambers, respectively, said filter means including at one end an imperforate tubular portion concentrically mounted for sliding movement on said sleeve;
   first spring means biasing said filter means toward said cavity end wall to cause the extremity of said imperforate portion to abut said sleeve abutment and to close said sleeve by-pass passage;
   second spring means biasing said sleeve away from said cavity end wall toward said filter means;
   means responsive to the pressure differential between said outer and inner chambers for displacing said filter means away from said cavity end wall when the pressure of the outer chamber exceeds that of the inner chamber by a predetermined value; and
   stop means limiting the extent of travel of said sleeve away from said cavity end wall to cause opening of said by-pass passage when said filter means is displaced by said pressure responsive means to produce movement thereof relative to said sleeve.

4. Apparatus as defined in claim 3 wherein said pressure responsive means comprises piston-motor means.

5. Apparatus as defined in claim 4 wherein said piston-motor means comprises an annular piston element connected with the end of said filter means remote from said cavity end wall, said housing cavity having intermediate its ends a cylindrical wall portion cooperating with said piston to define the cylinder of said piston-motor means.

6. Apparatus as defined in claim 5, and further including indicating means for presenting externally of said housing an indication of the position of said sleeve relative to said cavity end wall, said indicating means including a shaft rotatably mounted in a through opening in said cavity end wall axially of said cavity an indicator member secured to the shaft externally of the housing, and means connected with said shaft within said housing and cooperating with said sleeve to convert axial movement of said sleeve to rotary movement of said shaft.

7. Apparatus as defined in claim 3, wherein said housing includes a removable section carrying the other end wall of said cavity for effecting removal of said first spring means and said tubular filter means from said housing cavity.

No references cited.

SAMIH N. ZAHARNA, *Primary Examiner.*